(12) United States Patent
Togashi et al.

(10) Patent No.: US 6,231,800 B1
(45) Date of Patent: May 15, 2001

(54) METHOD FOR INJECTION MOLDING FOR EPOXY RESIN MOLDINGS AND AN INJECTION MOLDABLE EPOXY RESIN COMPOSITION

(75) Inventors: Eiki Togashi; Tsukasa Sakuraba, both of Sodegaura (JP)

(73) Assignee: Mitsui Chemicals, Tokyo (JP)

( * ) Notice: Subject to any disclaimer, the term of this patent is extended or adjusted under 35 U.S.C. 154(b) by 0 days.

(21) Appl. No.: 09/348,073

(22) Filed: Jul. 6, 1999

Related U.S. Application Data (63) Continuation of application No. 08/864,690, filed on May 28, 1997, now abandoned.

(30) Foreign Application Priority Data

| May 29, 1996 | (JP) | 8-135159 |
| Jul. 30, 1996 | (JP) | 8-200318 |
| Oct. 8, 1996 | (JP) | 8-267288 |

(51) Int. Cl.⁷ .......................... B29C 45/00; B29C 45/27; B29C 45/73
(52) U.S. Cl. .................. 264/328.2; 264/328.16; 264/331.12
(58) Field of Search ............... 264/328.2, 328.8, 264/328.16, 328.18, 331.12, 331.22

(56) References Cited

U.S. PATENT DOCUMENTS

| 3,386,956 | * | 6/1968 | Nawakowski et al. |
| 4,309,379 | | 1/1982 | Dannels et al. ............ 264/328.2 |
| 4,645,818 | * | 2/1987 | Andrews . |
| 4,835,240 | * | 5/1989 | Togashi et al. ............ 528/98 |
| 5,064,881 | * | 11/1991 | Togashi et al. ............ 523/443 |
| 5,449,480 | * | 9/1995 | Kuriya et al. ............ 264/328.18 |

* cited by examiner

Primary Examiner—Leo B. Tentoni (57) ABSTRACT

Disclosed is a method of injection-molding for epoxy resin moldings wherein an epoxy resin composition is used as starting material, a molding cycle is shortened, a continuous molding operation is possible and a waste portion after curing can be minimized as well as an injection-moldable epoxy resin composition excellent in thermal stability possessing latent-type curing characteristics capable of rapidly promoting curing reaction in a metal mold without being cured in an injection molding machine.

The aforesaid method is carried out by charging an epoxy resin composition possessing the latent-type curing characteristics into a mini-sprue metal mold which is composed of a manifold part, a mini-sprue part and an ejector-plate part and wherein a metal mold temperature at the manifold part is so maintained that the epoxy resin composition is molten but curing of the composition is not promoted, and injection-molding the composition.

9 Claims, 2 Drawing Sheets

METHOD FOR INJECTION MOLDING FOR EPOXY RESIN MOLDINGS AND AN INJECTION MOLDABLE EPOXY RESIN COMPOSITION

This is a continuation of application Ser. No. 08/864,690, filed May 28, 1997, now abandoned.

BACKGROUND OF THE INVENTION

1. Field of the Invention

The present invention relates to a method of injection-molding for epoxy resin moldings and to an injection-moldable epoxy resin composition. More particularly, the present invention relates to a method of injection-molding for epoxy rein moldings wherein a mini-sprue metal mold is used and to an injection-moldable epoxy resin composition suitable for such method possessing latent-type curing characteristics.

2. Description of the Related Art

It is well known that epoxy resins are excellent in various physical properties such as heat-resisting property, abrasion-resisting property, chemicals-resisting property and the like and are employed for various uses.

From the past, a transfer molding method is known as a means for molding epoxy resin materials which is appropriate in the aspect of productivity. In transfer molding, it is ordinary that an epoxy resin composition is cast in a pot of a metal mold prior to molding and the composition is then pressed by a plunger and cured under fluidization within the metal mold.

In this molding method, however, a material for molding has initially to be shaped into tablets and a preheating step is needed so that shortening of the molding cycle cannot be made over a given rate, thus making productivity and economization of cost naturally limitative. In transfer molding, moreover, there remains such a problem in the course of molding that a cull part remaining in the pot in addition to a runner part becomes a waste portion after curing.

The cured cull part is normally discarded as a waste without being recycled, but the waste is not decomposed and thus causes an environmental pollution.

In an injection-molding method, on the other hand, a thermoplastic resin powder for molding is only charged into a hopper whereby the subsequent preheating and weighing operations of the powder are automatically operated in a cylinder and the fluidized rein is injected into a metal mold where curing of the resin is effected. In this case, therefore, steps for shaping the molding material into tablets and preheating them are not required and furthermore a continuous production of the moldings becomes possible, thus making shortening of the molding cycle possible as compared with the transfer molding operation. The injection-molding method can thus be said to be superior in the aspect of production efficiency.

However, epoxy resin molding materials employed heretofore in transfer molding are inferior in thermal stability in the cylinder so that melt viscosity of the materials increases extremely to make injection-molding unable.

Figure 2:
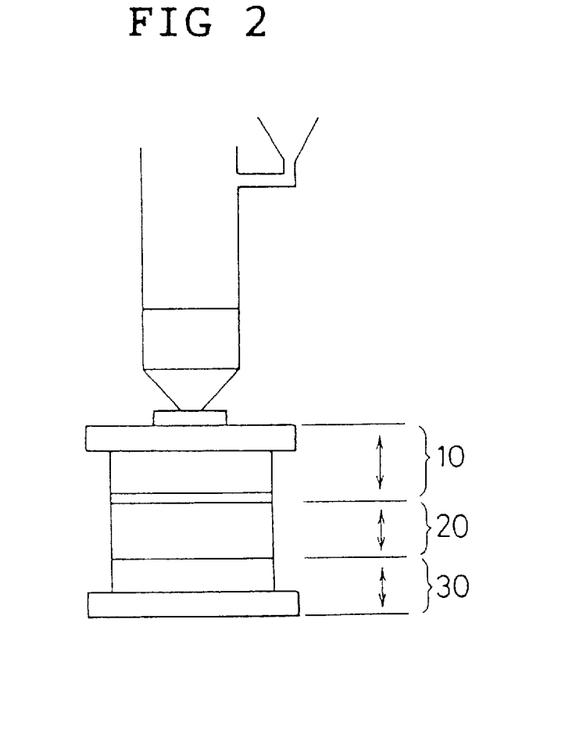
FIG. 2 is a side view of the whole mini-sprue metal mold used in the present invention.

As a metal mold for injection-molding of epoxy resins, there are known a conventionally used metal mold for injection-molding and a mini-sprue metal mold as shown in FIG. 2 which comprises a manifold part, a mini-sprue part and an ejector plate part. In a conventional metal mold for injection-molding, a part corresponding to the manifold part of the mini-sprue metal mold functioned as a sprue and a runner and was maintained together at a temperature where curing of the resin was promoted so that the whole manifold part and the sprue part were taken out together in cured state for every molding cycle.

Such a problem on the injection-molding may also take place in case of the transfer molding. As the metal mold is maintained as a whole at a temperature capable of promoting curing, the cull part and the runner part are taken out in cured state together with the moldings.

As the epoxy resin is a thermocuring resin, it cannot be recycled for use once it has been cured so that the above cured portions incidentally formed with the product produced on molding have to be discarded as such. The epoxy resin is longer in molding cycle as compared with the thermoplastic resin so that a number of problems to be improved remain also in the aspect of productivity.

SUMMARY OF THE INVENTION

In short, a molding material employing an epoxy resin involves not only an economic problem of a low production rate per amount of the resin used but also a pollution problem of discharging industrial waste accompanying environmental pollution.

Accordingly, it is an object of the present invention to provide a method of injection-molding for epoxy resin moldings wherein problems raised in the conventional molding method of epoxy resins can be solved by increasing productivity and shortening the molding cycle.

It is another object of the present invention to provide an injection-moldable epoxy resin composition which is excellent in thermal stability and possesses curing characteristics capable of rapidly promoting curing reaction in a metal mold without being cured in a cylinder.

Other objects, features and advantages of the present invention will become more fully apparent from the following description.

BRIEF DESCRIPTION OF THE DRAWINGS

The present invention will now become fully understood from the detailed description given hereinbelow and the accompanying drawings which are given by way of illustration only and wherein.

In these drawings, 10 is a manifold part, 11 a sprue, 12 a runner, 20 a mini-sprue part, 21 a mini-sprue, 22 a product part, 23 a mini-runner, 24 a gate part, 30 an ejector-plate part and 31 an ejector pin.

DETAILED DESCRIPTION OF THE INVENTION

The present invention has been proposed to achieve, the aforesaid objects and is featured by a method of injection-molding an epoxy resin as a starting polymer using a mini-sprue metal mold, and an epoxy resin composition suitably utilizable for the method possessing a specific gel time and melt viscosity characteristics or an epoxy resin composition having a specific gel time and activating energy for the reaction.

In accordance with one embodiment of the present invention, there is provided a method of injection-molding for epoxy resin moldings wherein an epoxy rein composition possessing a latent-type curing characteristics is charged into a mini-sprue metal mold which is composed of a manifold part, a mini-sprue part and an ejector-plate part and wherein the metal mold temperature at the manifold part is so maintained that the epoxy resin composition is molten but curing of the composition is not promoted, and thereafter the composition is subjected to injection-molding.

In accordance with another embodiment of the present invention, there is provided the aforesaid method of injection-molding for epoxy resin moldings wherein the metal mold temperature in the manifold part is maintained from 90° C. to 130° C. lower than the metal mold temperature at the mini-sprue part.

In accordance with still another embodiment of the present invention, there is provided the aforesaid method of injection-molding for epoxy resin moldings wherein the epoxy resin composition is an epoxy resin incorporated with a curing agent, a curing accelerator and an inorganic filler.

In accordance with further embodiment of the present invention, there is provided the aforesaid method of injection-molding for epoxy resin moldings wherein the epoxy resin is alone or in combination with one or more of o-cresol type epoxy resin, biphenyl type epoxy resin, naphthalene type epoxy resin and hydroquinone type epoxy resin.

In accordance with another aspect of the present invention, there is provided an injection-moldable epoxy resin composition composed of an epoxy resin, a phenol resin, a curing accelerating agent and an inorganic filler as indispensable ingredients wherein (1) a gel time at 80° C. is at least 1,500 seconds (for example, 1,500–5,000 seconds), (2) change in melt viscosity (the maximum value of melt viscosity/the minimum value of melt viscosity) at 100° C. is not more than 10 (for example, 1–10) within 18 minutes from the initiation of viscosity measurement, (3) change in melt viscosity (the maximum value of melt viscosity/the minimum value of melt viscosity) at 110° C. is not more than 7 (for example, 1–7) within 10 minutes from the initiation of viscosity measurement and (4) change in melt viscosity (the maximum value of melt viscosity/the minimum value of melt viscosity) reaches at 180° C. at least 10 (for example, 10–30) within 60 seconds from the initiation of viscosity measurement.

In accordance with still another embodiment of the present invention, there is provided the aforesaid injection-moldable epoxy resin composition wherein a gel time at 100° C. is at least 1,000 seconds.

In accordance with still further embodiment of the present invention, there is provided an injection-moldable epoxy resin composition composed of an epoxy resin, a phenol resin, a curing accelerator and an inorganic filler as indispensable ingredients wherein (1) a gel time at 80° C. is at least 1,500 seconds (for example, 1,500–5,000 seconds), (2) a gel time at 100° C. is at least 1,000 seconds (for example, 1,000–3,600 seconds) and (3) an activating energy for the reaction is at least 12,000 cal/mol (for example, 2,00–50,000 cal/mol).

In accordance with yet further embodiment of the present invention, there is provided the aforesaid epoxy resin composition wherein the epoxy resin is alone or in combination with one or more of o-cresol type epoxy resin, biphenyl type epoxy resin, naphthalene type epoxy resin and hydroquinone type epoxy resin.

DETAILED DESCRIPTION OF THE INVENTION

<Method of molding an epoxy resin composition>

An important technical feature of the first invention of the present case resides in injection-molding of a specific epoxy resin composition using a mini-sprue metal mold maintained at a specific temperature. According to this feature, the resin existing in the manifold part is at all times maintained in a fluid state without being cured so that the resin becomes continuously injection-moldable. Further, a cured solid other than the molded product is only from the mini-sprue part and the mini-runner part so that the molding cycle may be shortened with increasing the rate of productivity, thus obtaining a unique effect which has never been obtained in the conventional injection-molding of thermoplastic resins.

<Mini-sprue metal mold>

A metal mold used in the injection-molding of the present invention is constructed, as shown in the main part section view of FIG. 2, by a manifold part 10, a mini-sprue part 20 and an ejector plate part 30. The manifold part 10 is comprised of a sprue 11 and a runner 12, and a temperature of this part is so maintained that the epoxy resin is molten but curing is not promoted, for example, at 70–100° C. Such temperature condition is maintained usually by warming with a heater and on the other hand by cooling with a cooling water.

In the present invention, it is important that the manifold part functions as a zone controlling fusion of the epoxy resin and does not participate in curing of the epoxy resin.

Consequently, the epoxy resin existing in the sprue 11 and the runner 12 both constituting the manifold part can be maintained at all times in fluid state, without being cured, so that the resin is not taken out together with the moldings and is continuously subjected to injection-molding after the moldings and the mini-spue part are taken out.

The mini-sprue part 20 is a zone where the epoxy resin is cured, and is constructed by a mini-sprue 21, a product part (also referred to as "product part"), 22 for moldings, a mini-runner part 23 and a gate part 24. Thus, when the cured moldings (injection molded products) are taken out, the mini-sprue and the mini-runner part which are also taken out as cured solid simultaneously will be discarded.

The temperature of the mini-sprue part on molding is usually 160–200° C. and is set at about 90–130° C. higher than the temperature of the manifold part. part.

The ejector plate part is a zone where the moldings obtained after molding are released from the metal mold by pushing with an ejector pin 31 and the temperature of this zone is also maintained at a temperature such that curing of the epoxy resin is promoted just like the mini-sprue part.

Figure 3:
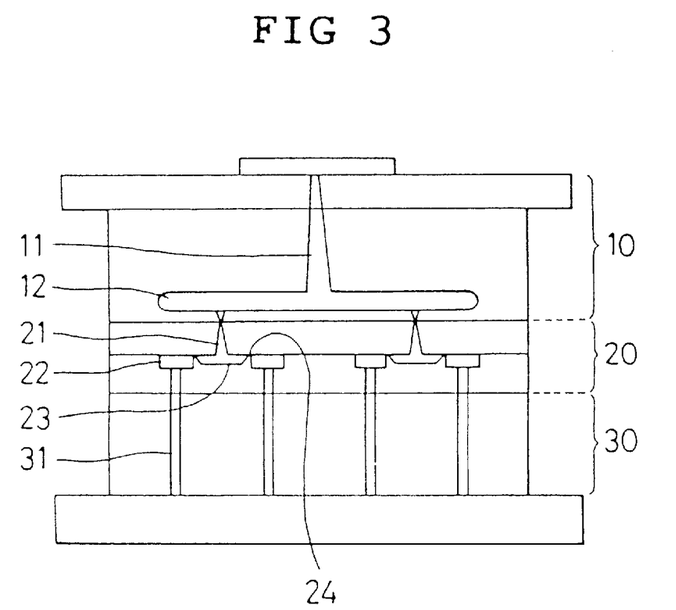
FIG. 3 is a section view of the main part shown in FIG. 2.

It is important that the epoxy rein used in the present invention is not cured in the manifold part in the mini-sprue metal mold shown in FIGS. 2 and 3 but is cured in the mini-sprue part.

In the present invention, the temperature of the metal mold in the manifold part is set within a range where the epoxy resin is molten but its curing is not promoted, i.e. at a temperature of 90–130° C. lower than the temperature of the mini-sprue part and the molding part in order to satisfy the above requirement.

It is important that the epoxy resin used in the present invention has a latent-type curing characteristics wherein the resin is not promoted in curing in the manifold part but is promoted in curing in the mini-sprue part in the mini-sprue metal mold as shown in FIG. 2 or 3. Illustrative of such epoxy resin composition are the compositions I, II and III as will be given hereinafter.

The epoxy resin composition used in the present invention satisfies the above requirements and thus contributes in shortening of the molding cycle in such manner that the composition is only molten and not promoted in curing in the manifold part but is promoted in curing by short gel time in the mini-sprue part.

<Epoxy resin composition>

The injection-moldable epoxy resin composition of the present invention contains an epoxy resin, phenol resin, a curing accelerator and an inorganic filler as indispensable ingredients and preferably involves the following three compositions:

The first composition (Composition I) has a gel time at 70° C. of at least 1,000 seconds, preferably a gel time at 100° C. of at least 1,000 seconds (for example, 1,000–3,600 seconds) and an activating energy for the reaction of 12,000 cal/mol.

The second composition (Composition II) has a gel time at 80° C. of at least 1,500 seconds (for example, 1,500–5,000 seconds), preferably a gel time at 100° C. of at least 1,000 seconds (for example, 1,000–3,600 seconds), wherein change in melt viscosity at 100° C. is not more than 10 (for example, 1–10) within 18 minutes from the initiation of viscosity measurement, change in melt viscosity at 110° C. is not more than 7 (for example, 1–7) within 10 minutes from the initiation of viscosity measurement, and change in melt viscosity at 180° C. reaches at least 10 (for example, 10–30) within 60 seconds from the initiation of viscosity measurement.

By the term "change in melt viscosity" in the present invention is meant herein the maximum value of melt viscosity divided by the minimum value of melt viscosity, i.e., "the maximum value of melt viscosity/the minimum value of melt viscosity".

In case the melt viscosity characteristics of the epoxy resin composition have been adjusted within the above mentioned range, the composition is excellent in thermal stability and is not cured in the cylinder to warrant rapid curing in the metal mold.

The third composition (Composition III) has a gel time at 80° C. of at least 1,500 seconds (for example, 1,500–5,000 seconds), a gel time at 100° C. of at least 1,000 seconds (for example, 1,000–3,600 seconds), and an activation energy for reaction of at least 12,000 cal/mol (for example, 12,000–50,000 cal/mol, preferably 12,000–30,000 cal/mol).

Among these epoxy resin compositions, Composition II and Composition III are especially preferable in the present invention.

The activation energy for reaction of the epoxy resin composition is calculated according to the following Arrhenius' reaction formula (1):

$$K = Ae^{-E/RT}$$

$$Ln\ K = Ln(1/G) = Ln\ A - E/RT \quad (1)$$

wherein K stands for a reaction velocity constant, A for a frequency constant, E for activation energy for reaction (cal/mol), R for a gas constant, T for temperature (° K.) and G for gel time (sec) of molding material.

E is obtained from a gradient of the graph $Ln\ (1/G)$ and $1/T$.

In case the gel time characteristics and the activation energy for reaction of the epoxy resin composition have been adjusted within the above mentioned range, the composition is excellent in thermal stability and is not cured in the cylinder to warrant rapid curing in the metal mold.

As epoxy resins utilizable for the epoxy resin composition of the present invention such as Composition II or III, any of the monomers and polymers having epoxy groups, such as one or more of o-cresol type epoxy resins, biphenyl type epoxy resins, naphthalene type epoxy resins and hydroquinone type epoxy resins can be mentioned so far as the requirements for the aforesaid melt viscosity characteristics, gel time characteristics or activation energy for reaction be satisfied. Any other epoxy resin than the above mentioned can also be employed if the requirements for the above characteristics be satisfied.

Epoxy resin compositions utiizable as the epoxy resin composition of the present invention such as Composition II or III are prepared by incorporating the aforesaid epoxy resin suitably with a phenol resin as a curing agent, a curing accelerator and an inorganic filler. Illustrative of the curing agent (phenol resin) are, for example, a phenol novolac resin and a dicyclopentadiene type phenol resin. A curing agent having a phenolic hydroxyl group and an acid hydrazide such as eicosanic hydrazide may be used as the curing agent for the present invention. These curing agents may be used singly or a mixture of two or more. Examples of the phenol novolac resin include novolac type phenol resins obtained by reacting a phenol such as phenol itself, cresol or xylenol with formaldehyde by the aid of an acidic catalyst as well as modified resins thereof, for example, epoxylated or butylated novolac type phenol resins. Above all, those having a hydroxyl group equivalent of 100 to 150 and a softening point of 60–110° C. are preferably used.

The curing agent is incorporated into the epoxy resin in an amount of 20–70 parts by weight, preferably in an amount of 40–60 parts by weight per 100 parts by weight of the epoxy resin. In case the phenol novolac resin is taken as an example, the above proportion corresponds to the case wherein the number of the phenolic hydroxyl group is 0.5 to 2.0, preferably about 1 per epoxy group in the epoxy resin.

As the curing accelerator are used aromatic or alicyclic dimethylurea and dicyanodiamide which can promote a curing reaction between the epoxy resin and the curing agent and satisfy thermal stability in a cylinder of an injection-molding machine and rapid curing property in a metal mold.

Illustrative of the curing accelerator are DBU derivatives such as 1,8-diazacyclo [5.4.0]undecene-7-phenol salt, phenol novolac salt and carbonate; imidazoles of CNS type and urea derivatives of the formula:

wherein Ar stands for a substituted or unsubstituted aryl group and two R's for the same or different alkyl groups. Among these curing accelerators, the use of a urea derivative of the above formula is preferable for obtaining the injection-moldable epoxy resin composition of the present invention.

The use of alkylurea derivatives of the following formulas (a)–(f) as the curing accelerator can improve stability at around 100° C., and as a result, thermal stability of the resin in the cylinder of an injection-molding machine is enhanced:

(a)

wherein $X_1$ and $X_2$ may be the same or different and each stand for a hydrogen atom, a halogen atom, an alkyl group, preferably a lower alkyl group with 1–5 carbon atoms, an alkoxy group or a nitro group, two R's may be the same or different and each stand for an alkyl group, preferably an alkyl group with 1–10 carbon atoms, more preferably a lower alkyl group with 1–5 carbon atoms.

Illustrative of compounds corresponding to the formula (a) are, for example, 3-phenyl-1,1-dimethylurea, 3-(chlorophenyl)-1,1-dimethylurea, 3-(3,4-dichlorophenyl)-1,1-dimethylurea, 3-(o-methylphenyl)-1,1-dimethylurea, 3-(p-methylphenyl)-1,1-dimethylurea, 3-(methoxyphenyl)-1,1-dimethylurea, and 3-(nitrophenyl)-1,1-dimethylurea.

(b)

wherein Y and Z may be the same or different and each stand for a hydrogen atom, a halogen atom or an alkyl group, preferably a lower alkyl group with 1–5 carbon atoms and two R's may be the same or different and each stand for a lower alkyl group with 1–10 carbon atoms (preferably 1–5 carbon atoms).

Illustrative of compounds corresponding to the formula (b) are, for example, 1,1'-phenylene-bis-(3,3-dimethylurea) and 1,1'-(4-methyl-m-phenylene)-bis-(3,3-dimethylurea).

(c)

wherein R's may be the same or different and each stand for a lower alkyl group.

wherein p is an integer of 0 to 5 and R's may be the same or different and each stand for an alkyl group, preferably an alkyl group with 1–10 carbon atoms, more preferably an alkyl group with 1–5 carbon atoms.

(e)

wherein two R's may be the same or different and each stand for a lower alkyl group.

(f)

wherein R's may be the same or different and each stand for an alkyl group, preferably an alkyl group with 1–10 carbon atoms, more preferably an alkyl group with 1–5 carbon atoms.

In the above formulas (a)–(f), preferable examples of the alkyl group or alkoxy group represented by $X_1$, $X_2$ and R include methyl group, ethyl group, propyl group and butyl group and the corresponding alkoxy groups. As a compound corresponding to the formula (e) is exemplified a dimethylamine adduct of 2,4-tolylene diisocyanate. Above all, the dimethylamine adduct is preferably used as it shows significantly improved stability at around 100° C. and curing characteristics adequate for injection-molding of the present invention. The curing accelerator is incorporated into the epoxy resin in an amount of 3–20 parts by weight, preferably 5–10 parts by weight per 100 parts by weight of the epoxy resin.

A curing accelerator which is devoid of thermal stability in the cylinder and is thus unable to be used alone for injection-molding, such as 2-methylimidazole or triphenyl phosphine utilizable from the past for transfer molding, can also be used jointly for shortening curing time in the metal mold.

Illustrative of the inorganic filler are, for example, powdery, fibrous or balloon fillers such as talc, ferrite, graphite, silicon nitride, mica, calcium carbonate, clay, alumina, alumina-silica, silica such as pulverized silica and spherical silica, zinc oxide, carbon, aluminum hydroxide, asbestos fiber, glass fiber, carbonaceous fiber, glass beads, Shirasu balloon, and silica balloon. Of these, pulverized silica, spherical silica and glass fiber are preferably used singly or in combination.

The epoxy resin composition of the present invention can optionally be incorporated with brominated epoxy resin, a hardly inflammable agent such as antimony trioxide, a silane coupling agent, a pigment such as carbon black or phthalocyanine, a natural or synthetic wax and a mold-releasing agent such as silicone oil.

<Effect of the Invention>

According to the present invention, there is provided a method for injection-molding an epoxy resin wherein an epoxy resin composition possessing specifc physical properties is used as a starting material for moldings and molded in a mini-sprue metal mold, the method bringing about such a merit that a molding cycle is shortened, a continuous molding operation is possible and a waste portion after curing can be minimized.

According to the present invention, epoxy resin moldings which have never been manufactured continuously in the prior art by way of injection-molding can now be manufactured efficiently by way of injection-molding. Thus, the present invention makes it for the first time possible to manufacture epoxy resin moldings inherently excellent in various physical properties in a continuous operation with a shortened molding cycle by way of injection-molding. In the present invention, the epoxy resin composition is not prematurely cured in an injection molding machine.

EXAMPLES

The present invention will now be illustrated in more detail by way of Examples and Comparative Examples, but it is to be construed that these Examples are given only for illustration and not intended to limit the scope of this invention.

Examples 1–3 and Comparative Examples 1 and 2

The proportion of the epoxy resin compositions in these Examples and Comparative Examples are shown in Table 1. A gel time at 80° C., a gel time at 100° C., a maximum value/minimum value of the viscosity from the initiation of viscosity measurement to a given period of time (referred to hereinafter as the melt viscosity characteristics at 100°), the melt viscosity characteristics at 110° C. and the melt viscosity characteristics at 180° C. of each composition were also measured and the results are shown in Table 1.

TABLE 1

| Composition | Ex 1 | Ex 2 | Ex 3 | Comp Ex 1 | Comp Ex 2 |
|---|---|---|---|---|---|
| o-Cresol novolac epoxy resin (Epoxy equivalent: 215) | 100 | 100 | 100 | 100 | 100 |
| Phenol novolac resin (Phenol equivalent 103) | 50 | 50 | 50 | 50 | 50 |
| Brominated epoxy resin (Epoxy equivalent 275) | 25 | 25 | 25 | 25 | 25 |
| Antimony trioxide | 5 | 5 | 5 | 5 | 5 |
| 3-(p-chlorophenyl-1,1-dimethylurea | 6 | — | — | — | — |
| A dimethylamine adduct* | — | 8 | — | — | — |
| 2-Methylimidazole of CNS type | — | — | 7 | — | — |
| Tris-(2,6-dimethoxyphenyl)phosphine | — | — | — | 3.5 | — |
| 2-Methylimidazole | — | — | — | — | 0.8 |
| Silica | 660 | 660 | 660 | 660 | 660 |
| Silane coupling agent | 4 | 4 | 4 | 4 | 4 |
| Carbon black | 1 | 1 | 1 | 1 | 1 |
| Carnauba wax | 3 | 3 | 3 | 3 | 3 |
| Gel time at 80° C. (second) | 3020 | 5120 | 2050 | 828 | 1230 |
| Gel time at 100° C. (second) | 1420 | 1800 | 1380 | 438 | 690 |
| Change in viscosity at 100° C. | 1.7 | 1.2 | 2.7 | 11.2 | 4.7 |
| Change in viscosity at 110° C. | 3.3 | 2.5 | 4.8 | 12.0 | 10.6 |

TABLE 1-continued

| Composition | Ex 1 | Ex 2 | Ex 3 | Comp Ex 1 | Comp Ex 2 |
|---|---|---|---|---|---|
| Change in viscosity at 180° C. (second) | 52 | 45 | 57 | 39 | 46 |

(Remarks)
(1) Ex stands for Example while Comp Ex for Comparative Example.
(2) The proportion of each ingredient is expressed in terms of gram.
(3) *A dimethylamine adduct is an adduct of 2 mols of dimethylamine to one mol of 2,4-tolylenediisocyanate represented by the formula:

In the present invention, measurements of change in viscosity and gel time were carried out according to the following method:
Measuring apparatus: Laboplastomill 20R200 Roller Mixer Model R-30 manufactured by KK Toyo Seiki Mfg. Works
Amount of resin composition measured: 43 g
Number of rotation of the rotor: 30 r.p.m.
Measurement temperature: for example, 80° C., 100° C. and 180° C. Viscosity: The viscosity was read out from torque in terms of kg·m on the chart shown in FIG. 1.
The initiation of measurement: The measurement is initiated from the Point B on the chart shown in FIG. 1.

Figure 1:
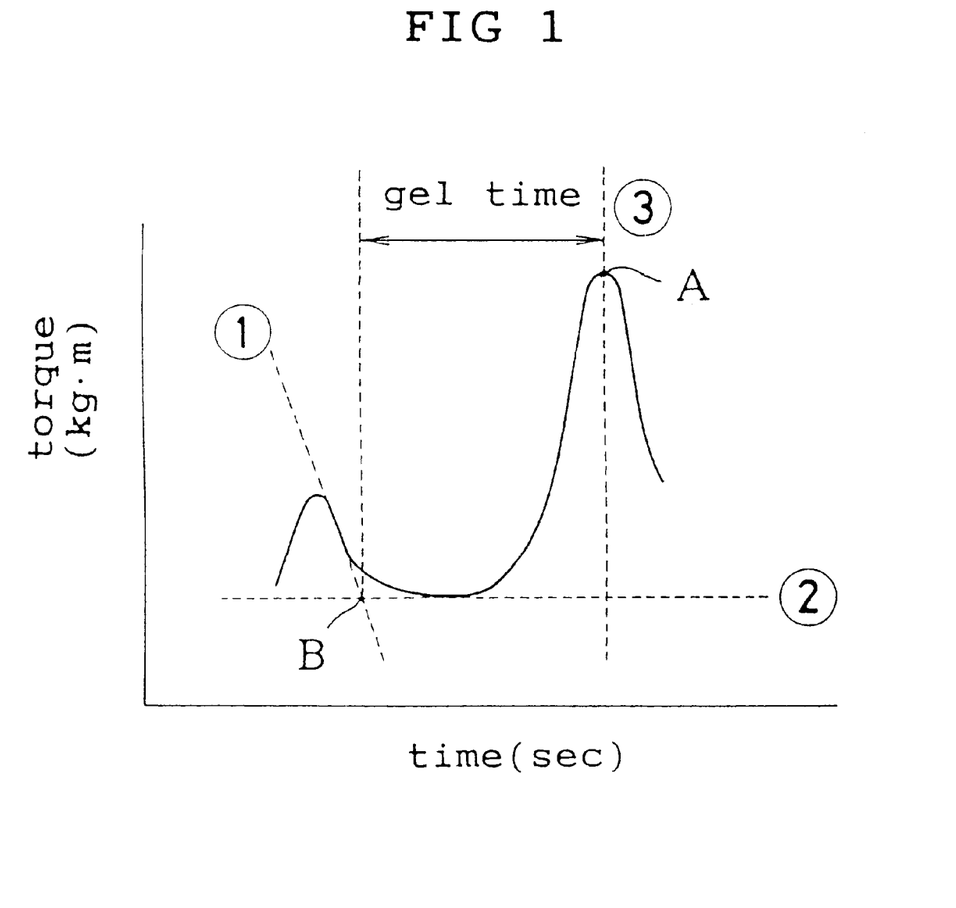
FIG. 1 is an explanatory drawing on the measurement of viscosity and on the measuring method of gel time in the present invention.

The gel time was determined by reading out a gel time on the chart shown in FIG. 1. First of all, lines are drawn respectively to a region showing depression of torque after addition of a sample (tangential line 1), a region keeping the minimum torque (tangential line 2) and the maximum torque point A (perpendicular line 3). Next, a length from a point of intersection between the tangential line 1 and the tangential line 2 to the perpendicular line 3 was measured to define the gel time.

In the present invention, the melt viscosity characteristics at 100° C. was defined by the maximum (MAX) value/the minimum (MIN) value of the viscosity within 18 minutes from the initiation of viscosity measurement (the point B). Likewise, the melt viscosity characteristics at 110° C. was defined by the maximum (MAX) value/the minimum (MIN) value of the viscosity within 10 minutes from the initiation of viscosity measurement (the point B), while the melt viscosity characteristics at 180° C. was defined by the period of time (in terms of second) during which the change in melt viscosity (MAX value/MIN value of the melt viscosity) reaches at least 10.

Injection-moldability (continuous moldability) of each epoxy resin composition was evaluated and is shown in Table 2 together with the sort of molding, molding condition, molding cycle, weight of discarded part and weight of product.

In Table 2, the injection-moldabilty was determined by shaping a metal mold and an injection-molding machine in such manner that a tip of the sprue bush part of the metal mold and a tip of the nozzle of the injection-molding machine may be touched with each other, and judging whether injection is possible to attain continuous moldability or impossible by curing of the resin at the tip of the nozzle.

TABLE 2

| Item | Ex 1 | Ex 2 | Ex 3 | Comp Ex 1 | Comp Ex 2 |
|---|---|---|---|---|---|
| Injection-moldability | possible | possible | possible | impossible | impossible |
| Continuous moldability | 500 shots * | 500 shots * | 500 shots * | 10 shots ** | 6 shots ** |
| Method of molding | injection | injection | injection | injection | transfer |
| Molding cycle (sec) | 80 | 60 | 55 | 55 | 90 |
| Weight of the discarded (g) | 33.1 | 33.1 | 33.1 | 33.1 | 42.5 |
| Weight of the product (g) | 24.0 | 24.0 | 24.0 | 24.0 | 24.0 |
| Molding conditions: | | | | | |
| Cylinder temperature | | | | | Charging time |
| Front part (° C.) | 76 | 76 | 72 | 72 | 12 sec |
| Rear part (° C.) | 45 | 45 | 45 | 45 | |
| Injection pressure (kg/cm$^2$) | 200 | 200 | 200 | 200 | curing time |
| Injection time (sec) | 22 | 22 | 22 | 22 | 61 sec |
| Curing time (sec) | 40 | 24 | 19 | 19 | Charging pressure |
| Temperature of metal mold (° C.) | 185 | 185 | 185 | 185 | 200 kg/cm$^2$ |

(Remarks)
* continuously moldable in nozzle touched state
** cured at the tip, not filled with the resin, injection impossible Examples 4–6 and Comparative Examples 3 and 4

The proportion of the epoxy resin compositions in these Examples and Comparative Examples are shown in Table 3. A gel time at 80° C., a gel time at 100° C., and activation energy (cal/mol) for reaction of each composition were measured and injection moldabilty (continuous moldability) was evaluated for each composition. Results of the measurements and evaluation are also shown in Table 3 together with the sort of molding, the molding conditions, the molding cycle, the weight of the discarded portion and the weight of the product portion.

The continuous moldability was evaluated by continuously shaping a metal mold and an injection-molding machine in such manner that a tip of the sprue bush part of the metal mold and a tip of the nozzle of the machine may be touched with each other and, after injection, checking whether or not a cushion amount remaining in the tip of the nozzle is stable and the resin is charged into the mold.

In these Examples and Comparative Examples, the measurement of the gel time and the activation energy was made in the same manner as described above.

TABLE 3

| Composition | Ex 4 | Ex 5 | Ex 6 | Comp Ex 3 | Comp Ex 4 |
|---|---|---|---|---|---|
| o-Cresol novolac epoxy resin (epoxy equiv. 215) | 100 | 100 | 100 | 100 | 100 |
| Phenol novolac resin (phenol equiv. 103) | — | 50 | 45 | 50 | 50 |
| Brominated epoxy resin (epoxy equiv. 275) | 16 | 25 | 27 | 25 | 25 |
| Antimony trioxide | 5 | 5 | 6 | 5 | 5 |
| 1,3-bis-(hydrazinocarboethyl)-5-isopropyl hydantoin | 36 | — | — | — | — |
| Dimethylamine adduct to 2,4-tolylenediisocyanate | — | — | 8 | — | — |
| 3-p-(chlorophenyl)-1,1-dimethylurea | 3 | 6 | — | — | — |
| 2-Methylimidazole | — | — | — | 0.8 | — |
| Tris-(2,6-dimethoxyphenyl)phosphine | — | — | — | — | 3.5 |
| Silica | 562 | 660 | 650 | 660 | 660 |
| Silane coupling agent | 3.5 | 4 | 4 | 4 | 4 |
| Carbon black | 1 | 1 | 1 | 1 | 1 |
| Carnauba wax | 3 | 3 | 3 | 3 | 3 |
| Gel time at 80° C. (second) | 4070 | 3020 | 5120 | 1230 | 823 |

TABLE 3-continued

| Composition | Ex 4 | Ex 5 | Ex 6 | Comp Ex 3 | Comp Ex 4 |
|---|---|---|---|---|---|
| Gel time at 100° C. (second) | 1850 | 1420 | 1800 | 690 | 438 |
| Activation energy for reaction (cal/mol) | 12035 | 15416 | 18065 | 11432 | 7894 |
| Molding method | injec | injec | injec | injec | injec |
| Injection-moldability (continuous moldability) | OK | OK | OK | *1 | *2 |
| Molding cycle (second) | 80 | 60 | 55 | 55 | 55 |
| Weight of the discarded portion (g) | 33.1 | 33.1 | 33.1 | 33.1 | 42.5 |
| Weight of the product portion (g) | 24.0 | 24.0 | 24.0 | 24.0 | 24.0 |

(Remarks)
(1) The proportion of each ingredient is expressed in terms of gram.
(2) "equiv" means equivalent
(3) *1: At the time of 10 shots, the resin was cured at the tip of the nozzle and not charged into the mold so that the injection was impossible.
(4) *2: At the time of 6 shots, the resin was cured at the tip of the nozzle and not charged into the mold so that the injection was impossible.

In Examples 4–6, the cushion amount (mm) for evaluating continuous moldability was as shown Table 4 below.

TABLE 4

| Shot number | Example 4 | Example 5 | Example 6 |
|---|---|---|---|
| 50 | 2.2 | 2.2 | 2.1 |
| 100 | 1.9 | 2.3 | 2.2 |
| 200 | 2.3 | 2.5 | 1.9 |
| 300 | 2.3 | 2.0 | 1.8 |
| 400 | 2.2 | 1.8 | 2.3 |
| 500 | 2.1 | 2.4 | 2.1 |

The molding conditions in the above Examples and Comparative Examples are as shown in Table 5 below.

TABLE 5

| Molding conditions | Ex 4 | Ex 5 | Ex 6 | Comp Ex 3, 4 |
|---|---|---|---|---|
| Cylinder temperature (° C.) | | | | |
| Front part | 78 | 78 | 79 | 72 |
| Rear part | 45 | 45 | 45 | 45 |
| Injection pressure (kg/cm$^2$) | 95 | 100 | 92 | 140 |

TABLE 5-continued

| Molding conditions | Ex 4 | Ex 5 | Ex 6 | Comp Ex 3, 4 |
|---|---|---|---|---|
| Injection time (second) | 22 | 22 | 22 | 22 |
| Curing time (second) | 40 | 24 | 24 | 19 |
| Metal mold temperature (° C.) | 185 | 185 | 185 | 185 |
| Molding method | Inj | Inj | Inj | Inj |
| Molding cycle (second) | 80 | 60 | 60 | 55 |
| Weight of the discarded portion (g) | 33.1 | 33.1 | 33.1 | 33.1 |
| Weight of the product Portion (g) | 24.0 | 24.0 | 24.0 | 24.0 |

(Remarks) (1) "inj" means injection molding.

Examples 7 and 8 and Comparative Examples 5–8

The proportion of the epoxy resin compsitions in these Examples and Comparative Examples is shown in terms of gram in Table 6 below.

TABLE 6

| Composition | Ex 7 | Ex 8 | Comp Ex 5 | Comp Ex 6 | Comp Ex 7 | Comp Ex 8 |
|---|---|---|---|---|---|---|
| Epoxy resin (epoxy equivalent 215) | 100 | 100 | 100 | 100 | 100 | 100 |
| Phenol novolac resin (phenol equivalent 103) | 50 | 50 | 50 | 50 | 50 | 50 |
| Brominated epoxy resin (epoxy equivalent 275) | 25 | 25 | 25 | 25 | 25 | 25 |
| Antimony trioxide | 5 | 5 | 5 | 5 | 5 | 5 |
| 3-(p-Chlorophenyl)-1,1-dimethylurea | 6 | — | — | — | 6 | 6 |
| 2-Methylimidazole-CNS | — | 7 | — | — | — | — |
| 2-Methylimidazole | — | — | 0.7 | — | — | — |
| Triphenylphosphine | — | — | — | 3.5 | — | — |
| Silica | 660 | 660 | 660 | 660 | 660 | 660 |
| Carnauba wax | 3 | 3 | 3 | 3 | 3 | 3 |
| Silane coupling agent | 4 | 4 | 4 | 4 | 4 | 4 |
| Carbon black | 1 | 1 | 1 | 1 | 1 | 1 |

(Remarks) The proportion of each ingredient is expressed in terms of gram.

In Examples 7 and 8 and Comparative Examples 5 and 6, the injection-molding operation was carried out by using the mini-sprue metal mold. In Comparative Example 7, on the other hand, the injection-molding operation was carried out by using a conventional metal mold. In contrast to these, Comparative Example 8 was carried out according to transfer molding. The molding conditions of each Example are shown in Tables 7–9 below.

<Injection-molding using the mini-sprue metal mold>

TABLE 7

| Conditions (unit) | Ex 7 | Ex 8 | Comp Ex 5, 6 |
|---|---|---|---|
| Cylinder temperature (° C.) | | | |
| Front part | 84 | 84 | 84 |
| Rear part | 45 | 45 | 45 |
| Injection pressure (kg/cm$^2$) | 200 | 200 | 200 |
| Injection time (second) | 10 | 10 | 15 |
| Curing time (second) | 12 | 22 | 50 |
| Temperature of manifold part (° C.) | 80 | 80 | 80 |
| Temperature of product part (° C.) | 180 | 180 | 180 |

<Injection-molding using a conventional metal mold>

TABLE 8

| Molding conditions | Comp Ex 7 |
|---|---|
| cylinder temperature (° C.) | |
| Front part | 84 |
| Rear part | 45 |
| Injection pressure (kg/cm$^2$) | 200 |
| Injection time (second) | 20 |
| Curing time (second) | 24 |
| Temperature of the metal mold (° C.) | 185 |

<Transfer molding>

TABLE 9

| Molding conditions | Comp Ex 8 |
|---|---|
| Charging time (second) | 12 |
| curing time (second) | 61 |
| Charging pressure (kg/cm$^2$) | 200 |

Results of the molding operation of Examples 7 and 8 and Comparative Examples 5–8 are shown in the following Table 10:

TABLE 10

| Item | Ex 7 | Ex 8 | Comp Ex 5 | Comp Ex 6 | Comp Ex 7 | Comp Ex 8 |
|---|---|---|---|---|---|---|
| A. Discarded part (g) | 10.8 | 10.8 | 10.8 | 10.8 | 33.1 | 42.5 |
| B. Product part (g) | 24.0 | 24.0 | 24.0 | 24.0 | 24.0 | 24.0 |
| Production ratio (B)/(A + B) | 69.0 | 69.0 | 69.0 | 69.0 | 42.1 | 36.1 |
| Molding cycle (second) | 32 | 42 | 87 | 30 | 60 | 90 |
| Continuous Moldability | OK*1 | OK*1 | NG*2 | NG*3 | OK*1 | — |
| Gel time at 100° C. (second) | 1420 | 1380 | 600 | 390 | 1420 | 1420 |
| Activation energy (Cal/mol) | 15416 | 13668 | 11432 | 11034 | 15416 | 15416 |
| Molding method | A | A | A | A | B | C |

(Remarks)
(1) *1: Continuously moldable by 500 shots, a tip of the nozzle was not cured
(2) *2: At the time of 6th shot, the resin was cured at the tip of the nozzle of the molding machine and in the manifold part so that a continuous shot could no longer be made.
(3) *3: At the time of 4th shot, the resin was cured in the nozzle part of the molding machine and in the manifold part so that a continuous shot could no longer be made.
(4) A: Injection-molding using the mini-sprue mold
(5) B: Injection-molding using a conventional mold
(6) C: Transfer molding The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of injection molding for epoxy resin moldings, comprising,
    charging a curable epoxy resin composition into a mini-sprue metal mold comprising a manifold part, a mini-sprue part, a product part, and an ejector-plate part,
    wherein the curable epoxy resin composition comprises epoxy resin, curing agent, curing accelerator, and inorganic filler, wherein the epoxy resin is at least one of the following types of epoxy resins: o-cresol type epoxy resin, biphenyl type epoxy resin, naphthalene type epoxy resin, and hydroquinone type epoxy resin, and further wherein, the curable epoxy resin composition has the following latent curing properties:
        (1) a gel time at 80° C. of at least 1,500 seconds,
        (2) a gel time at 100° C. of at least 1,000 seconds, and
        (3) an activating energy for the curing reaction of at least 12,000 cal/mol;
    maintaining the temperature of the manifold part of said mini-sprue metal mold at a temperature at which the curable epoxy resin composition is in the molten state but less than the temperature at which the composition will cure; and
    injection molding the curable epoxy resin composition in the product part of the mini-sprue metal mold.

2. The method of claim 1, further comprising maintaining the temperature of the manifold part at from 90° C. to 130° C. lower than the temperatures of the mini-sprue part and the product part.

3. The method of claim 1, further comprising maintaining the temperatures of the mini-sprue part and the product part of the mini-sprue metal mold in the range of from 160° C. to 200° C.

4. The method as claimed in claim 1, wherein the curing agent is incorporated into the epoxy resin composition in an amount of 20–70 parts by weight per 100 parts by weight of the epoxy resin.

5. The method as claimed in claim 1, wherein the curing accelerator is incorporated into the epoxy resin composition in an amount of 3–20 parts by weight per 100 parts by weight of the epoxy resin.

6. The method according to claim 1 wherein the curing agent is a phenol novolac resin.

7. The method according to claim 1 wherein the curing accelerator is an alkylurea compound selected from the group consisting of wherein $X_1$ and $X_2$, may be the same or different and represent hydrogen atom, halogen atom, alkyl group, alkoxy group, or nitro group;

Y and Z may be the same or different and each represents a hydrogen atom, a halogen atom or an alkyl group;

each of the R's may be the same or different and represent alkyl of from 1 to 10 carbon atoms; and p represents an integer of 0 to 5.

8. The method according to claim 7 wherein the curing accelerator is selected from the group consisting of 3-phenyl-1,1-dimethyl urea, 3-(chlorophenyl)-1,1-dimethylurea, 3-(3,4-dichlorophenyl)-1,1-dimethylurea, 3-(o-methylphenyl)-1,1-dimethylurea, 3-(p-methylphenyl)-1,1-dimethylruea, 3-(methoxyphenyl)-1,1-dimethylurea, 3-(nitrophenyl)-1,1-dimethylurea, 1,1'-phenylene-bis-(3,3-dimethylurea), and 1,1'-(4-methyl-m-phenylene)-bis-(3,3-dimethylurea).

9. The method according to claim 7 wherein the curing accelerator is a dimethylamine adduct of 2,4-tolylene diisocyanate of formula (f).

* * * * *